Figure 1:
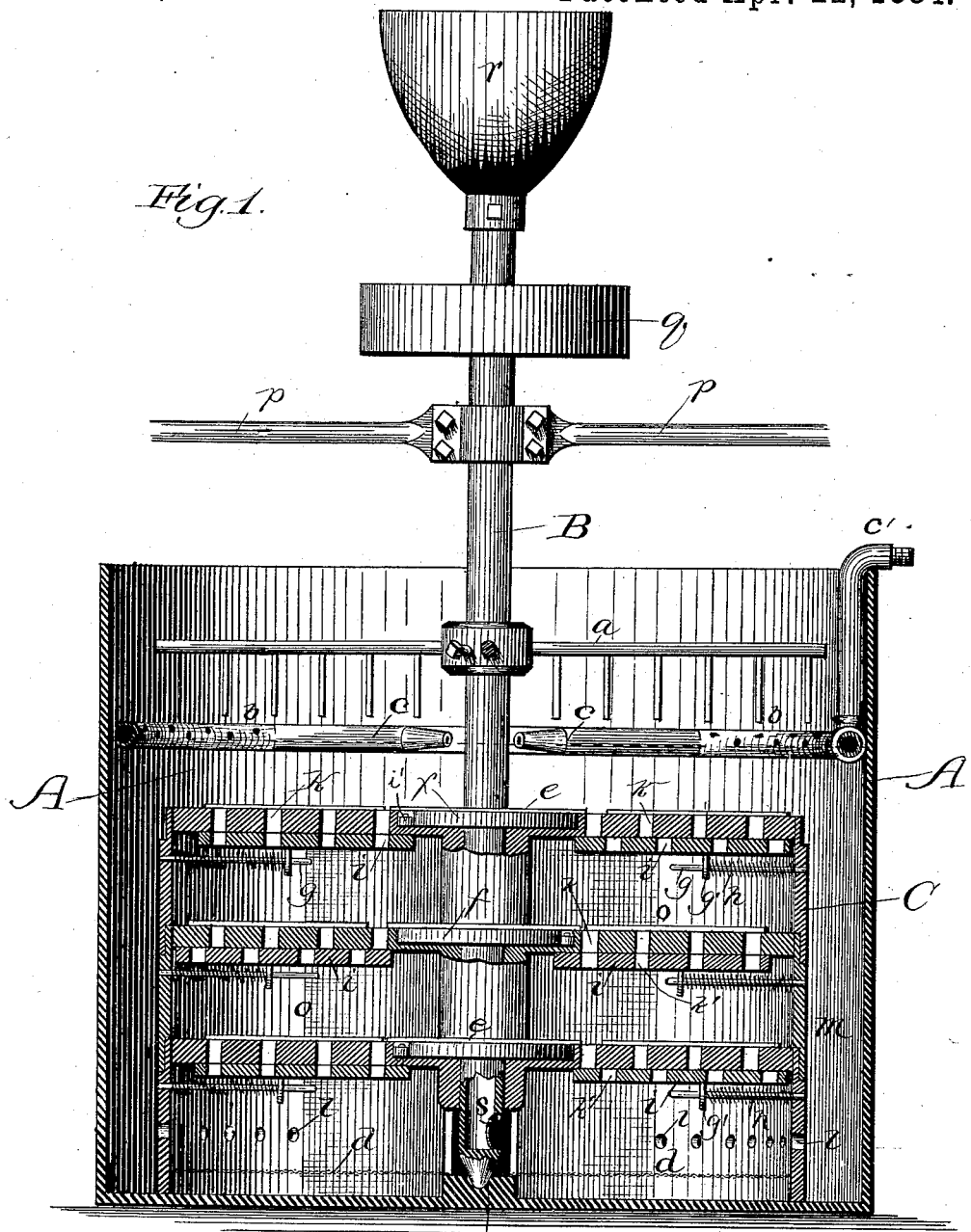

(No Model.) 2 Sheets—Sheet 2.
A. H. BLISS.
PROCESS OF AND APPARATUS FOR SEPARATING METALS FROM THEIR ORES.
No. 297,105. Patented Apr. 22, 1884.
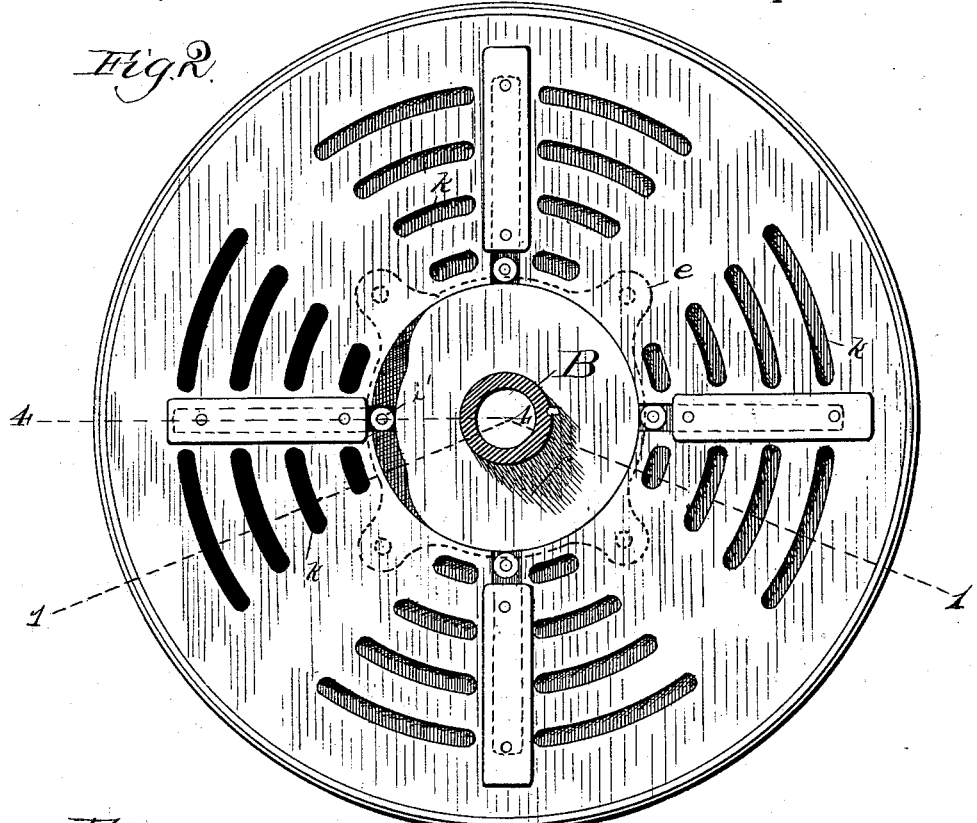
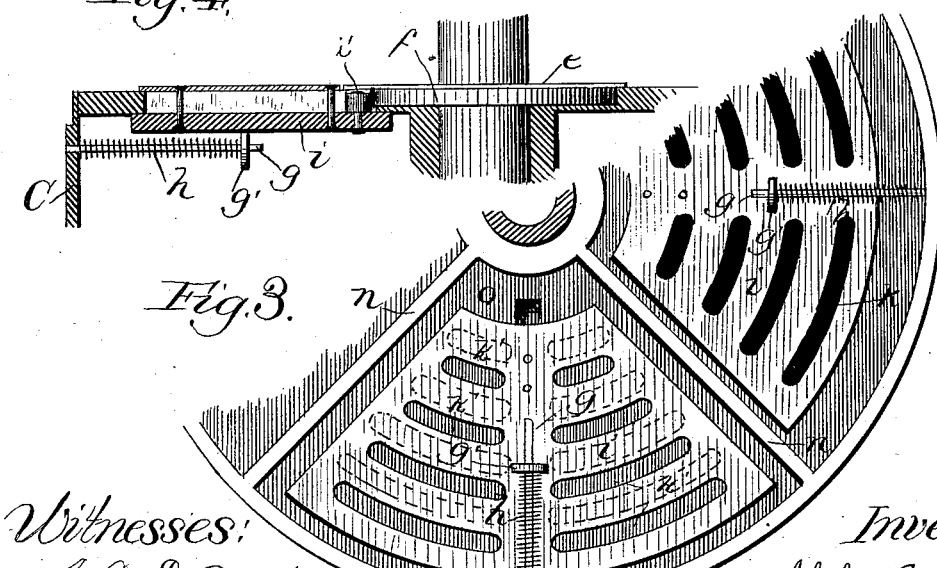
Witnesses:
Chas. E. Gaylord
Douglas Dyrenforth
Inventor:
Abel H. Bliss,
By Dyrenforth & Dyrenforth,
Att'ys.

UNITED STATES PATENT OFFICE.

ABEL H. BLISS, OF CHICAGO, ILLINOIS.

PROCESS OF AND APPARATUS FOR SEPARATING METALS FROM THEIR ORES.

SPECIFICATION forming part of Letters Patent No. 297,105, dated April 22, 1884.

Application filed January 16, 1884. (No model.)

*To all whom it may concern:*

Be it known that I, ABEL H. BLISS, a citizen of the United States, residing at Chicago, in the county of Cook and State of Illinois, have invented a new and Improved Process of and Apparatus for Separating Gold and other Metals from their Ores by means of Mercury; and I hereby declare the following to be a full, clear, and exact description of the same.

My invention relates, especially, to the treatment of gold ores and their alloys, or ores having a greater specific gravity than mercury; but it can be used with more or less success with all amalgamating ores.

Most processes used with mercury depend entirely upon amalgamation for their effects. Others depend in part upon specific gravity; but none, so far as I am aware, overcome the disturbing effects of a current caused by the rising of the ore through the mercury by allowing the mercury to remain for a sufficient time in a state of quiescence for complete amalgamation to take place or for the operation of gravity; but in all, the amalgam, or amalgamated particles of the triturated ore, is to a greater or less extent carried upward by the currents, together with the lighter particles. My invention is founded upon the hypothesis that separation can be most effectually attained by combined actions of amalgamation and gravity, the latter being assisted by a downward current in the mercury while the ore itself is passing upward; also, by the retention of the ore beneath a body of mercury by stopping its upward passage for a brief time, giving the particles of a superior specific gravity time to descend, and giving amalgamation time to act—that is to say, if a body of ore reduced to a finely-divided state is allowed to pass into a chamber containing mercury in a state of quiescence, and is caused to remain there for a brief period, and then is allowed to pass into a body of mercury in another chamber above the first, a portion of the mercury in the upper chamber simply changes place with the ore rising from the lower chamber, producing a downward current of the mercury, whereby the free metal and amalgam are carried downward, and ultimately settle upon the bottom. If the operation is permitted to take place through a series of vertical chambers opening and closing alternately, and if the mercury is caused to flow in a circuit through them proportioned in its speed to the quantity of the rising ore, whereby they are constantly kept filled, it is obvious that the operation will be rendered continuous. In this way ample opportunity is given for the amalgamation to take place, while the downward current of the mercury aids the descent of the amalgam and of that which does not amalgamate, but which has a specific gravity superior to that of mercury, and carries it to the bottom. In addition, the pulp passing to the top of a chamber and there receiving the pressure of the mercury from below increases the tendency of all the heavier particles of the ore to descend into the mercury and accelerates the amalgamation.

My invention consists in the process above outlined, and also in the apparatus by means of which I carry it into effect.

In the drawings, Figure 1 is a vertical section of my apparatus, taken on the line 1 1 of Fig. 2; Fig. 2, a top view of one section of chambers; Fig. 3, a bottom view of the same, and Fig. 4 a section taken on the line 4 4 of Fig. 2.

A is a vessel for containing a body of mercury, and B a rotary stand-pipe resting in the seat *t* at the bottom of the vessel A, and provided with one or more discharge-openings, *s*, near its bottom, a hopper, *r*, at its upper end to receive the triturated ore, and a pulley, *q*, to permit it to be revolved by a belt. It may be stayed by suitable bearings, *p*.

Resting within the vessel A is a device, C, formed in horizontal sections fitted together, each comprising a set of sectoral-shaped chambers, *o*, formed by radial partitions *n*. The sections of the hollow body C may be one, two, three, or more in number, as circumstances may require. The diameter of the body C is less than that of the interior of the vessel A, whereby an annular space, *m*, exists between the two, and the lowest section is provided with side openings, *l*, connecting its interior with the annular chamber *m*.

Each sectoral compartment *o* is provided with openings *k* in its top, either in the form of slots, as shown, or circular, or of any other suitable form, permitting communication to be established between any two adjacent compartments in the same vertical series.

On either the under side, as shown, or upon the upper side of the top of each sectoral compartment is a sliding plate, $i$, provided with openings $k'$, preferably corresponding in form and size with the openings $k$ in the top of the compartment. Spring mechanism—as, for example, a spring, $h$—surrounding a rod, $g$, fixed to the outer wall of each sectoral compartment, and passing through a bearing, $g'$, upon the plate $i$, tends to maintain the plate in a position to have the openings register.

On the shaft B, and rigidly fixed thereto, whereby they revolve with it, are cams $f$, acting against the inner ends of the sliding plates $i$ or against rollers $i'$ upon the said plates successively to push them back in opposition to the spring $h$ and release them, whereby communication between any two adjacent vertical chambers is alternately opened and closed. The cams are covered over by rigid plates $e$, to prevent the cams in their revolution from creating a disturbance of the mercury. If desired, the cams may be arranged to open communication between the chambers and the springs to close them.

Each compartment of the lowest section of the body C may be provided with a screen, $d$, at a short distance above its lower end, to protect the amalgam and free metal collecting at the bottom from the agitation caused within the lowest section by the entering pulp. In the upper part of the vessel A are water-pipes $c$, fed by a pipe, $c'$, preferably discharging upward or laterally through apertures $b$, to wash the tailings away, and, if desired, the shaft B may be provided with stirrers $a$.

The operation is as follows: The vessel A is filled with mercury to about the level indicated in Fig. 1, and the mercury is caused to enter and fill every compartment of the body C. The shaft B is caused to rotate, and triturated ore, wet sufficiently to cause it to run freely, is fed into the hopper $r$. The ore passes by way of the discharge-openings $s$ into the several sectoral compartments of the lowest section of the body C, the mercury displaced thereby finding its way through the openings $l$ or under the bottom of the chamber into the annular space $m$. The arrangement of cams is such that whenever the ore enters one of the lowest set of sectoral compartments that compartment is closed at the top, and remains so for a brief period after the ingress of the ore; also, that whenever communication is established between any chamber and the one next above it, the top of the latter chamber is closed, and continues so for a brief period. This causes the mercury in any compartment to have frequent intervals of almost perfect quiescence, and these intervals of quiescence always immediately follow the introduction of ore into the compartment, combined with the pressure created by obstructing the upward passage of the pulp. This, in itself, affords opportunity for amalgamation and for the settling of the heavier particles far superior to that which is afforded by apparatuses in which continuous currents exist in the mercury, and in which the pulp can pass upward freely; but, in addition to this, in my device the settling of the heavier particles is accelerated by a downward tendency of the mercury within the body C, produced in the following manner: The major part of the triturated ore, being lighter than the mercury, tends upward, and upon entering any sectoral compartment accumulates at the top of that compartment, passing into the next compartment above as soon as communication between the two is opened. The top of this last-named compartment being meanwhile closed, as before stated, the only avenue of escape for the mercury displaced by the ore is downward into the compartment below, the rising ore and a corresponding quantity of mercury simply exchanging places. This occurs throughout each vertical series of chambers. In this way, by the time the ore has escaped from the uppermost compartment, it has become almost completely divested of its precious metal. It is then washed away by the water escaping through the pipes $c$.

The apparatus above described is perfectly adapted to carry my process into effect; but as this process consists, (as will be apparent from the foregoing description,) first, in introducing the pulp beneath a column of mercury, and alternately stopping its upward progress and permitting it to continue the same, whereby, for one or more brief periods in its passage through the mercury, it is caused to come to rest within mercury in a state of quiescence, and, secondly, in creating downward currents in that portion of the mercury through which the pulp rises by intermittent stages, as above, thereby aiding the settling of the amalgam and of the heavier particles, it is obvious changes may be made in the apparatus without departing from my invention. So far as the process is concerned, it is not material, for example, how many compartments are employed, either in the horizontal sections or in the vertical series, or by what mechanism the compartments are consecutively opened and closed.

It may be suggested that the number of compartments in vertical series should be increased or diminished, according as the ore presents greater or less difficulty in its treatment. Thus, whereas a single stopping and release will suffice with some ores, with others the best results can be secured only by causing it to be stopped and released several times in the course of its upward progress.

What I claim as new, and desire to secure by Letters Patent, is—

1. The process herein described of separating metals from their ores, which consists in introducing the ore in a triturated condition into a body of mercury below the surface of the same, and then successively stopping and releasing it, once or oftener, in its upward progress through the mercury, substantially as described.

2. In an apparatus for separating metals from their ores, the combination of the following elements: a vessel, A, for containing mercury, means for charging the ore in a triturated condition into the mercury below the surface of the same, a hollow body, C, within the vessel A, having a diameter less than that of the vessel, whereby a space exists between the two, and containing one or more compartments, and opening at or near its base into the annular chamber, and mechanism for opening and closing the tops of the compartments, substantially as described.

3. In an apparatus for separating metals from their ores, the combination, with a vessel for containing mercury, and with means for charging the ore in a triturated condition into the said vessel near its base, of mechanism for alternately stopping and releasing the ore in its progress upward through the mercury, all substantially as described.

4. In an apparatus for separating metals from their ores, the combination, with a vessel for containing mercury, and with means for charging the ore in a triturated condition into the said vessel near its base, of mechanism for alternately stopping and releasing the ore in its upward progress through the mercury, and mechanism for creating a downward current in that portion of the mercury through which the ore rises, all substantially as described.

5. In an apparatus for separating metals from their ores, the combination, with a vessel, A, for containing mercury, of the rotary stand-pipe B, having a hopper at its upper end, one or more openings near its lower end, and means for revolving it, a hollow body, C, within the vessel, of smaller diameter than the vessel, whereby an annular space exists between the two, and opening at or near its base into the said annular space, and containing one or more sets of compartments intercommunicating in vertical series, and mechanism operated automatically by the rotation of the stand-pipe for opening and closing communication between the compartments in vertical series consecutively, substantially as described.

6. In an apparatus for separating metals from their ores, the combination of the following elements: a vessel for containing mercury, a rotary stand-pipe supported within the said vessel, and having one or more discharge-openings near its lower end and a hopper at its top, means for permitting the said stand-pipe to be revolved, a hollow body, C, of smaller diameter than the vessel and standing around the stand-pipe within the vessel, and opening at or near its base into the space surrounding it, said body being formed in sections superposed one upon another, and divided by partitions into compartments having openings in their tops, sliding plates $l$ in contact with the tops of the compartments and provided with openings to register with those in the said tops, and mechanism for sliding the said plates back and forth through the revolution of the stand-pipe, comprising cams $o$ upon the stand-pipe, and spring mechanism acting in opposition to the cams, substantially as described.

ABEL H. BLISS.

In presence of—
DOUGLAS DYRENFORTH,
CHARLES C. LINTHICUM.